United States Patent [19]
Guibert et al.

[11] Patent Number: 5,633,944
[45] Date of Patent: May 27, 1997

[54] METHOD AND APPARATUS FOR AUTOMATIC OPTICAL RECOGNITION OF ROAD SIGNS

[75] Inventors: Laurent Guibert, Brest; Mondher Attia, Montrouge; Alain Servel, Meudon, all of France

[73] Assignees: Automobiles Peugeot, Paris; Automobiles Citroen, Neuilly Sur Seine, both of France

[21] Appl. No.: 424,084

[22] Filed: Apr. 19, 1995

[30] Foreign Application Priority Data

Apr. 19, 1994 [FR] France ................... 94 04654

[51] Int. Cl.$^6$ ............................................. G06K 9/74
[52] U.S. Cl. ............................... 382/100; 382/211
[58] Field of Search .......................... 382/100, 104, 382/210, 211; 364/822; 359/559, 561; 356/351, 360

[56] References Cited

U.S. PATENT DOCUMENTS

| | | | |
|---|---|---|---|
| 4,371,866 | 2/1983 | Smith | 340/146.3 F |
| 4,695,973 | 9/1987 | Yu | 364/822 |
| 5,175,775 | 12/1992 | Iwaki et al. | 382/31 |
| 5,233,554 | 8/1993 | Conley et al. | 364/822 |
| 5,282,067 | 1/1994 | Liu | 359/4 |
| 5,528,702 | 6/1996 | Mitsuoka et al. | 382/211 |

FOREIGN PATENT DOCUMENTS 0 532 379  3/1993  European Pat. Off. ......... G06K 9/74

OTHER PUBLICATIONS

Q. Tang et al., "Multiple-object detection with a chirp-encoded joint transform correlator," *Applied Optics*, vol. 32, No. 10, Sep. 1993, pp. 5079-5088.

Primary Examiner—Andrew Johns
Attorney, Agent, or Firm—Burns, Doane, Swecker & Mathis, L.L.P.

[57] ABSTRACT

A process and device for automatic recognition of an object such as a road sign includes a laser beam source providing a laser beam capable of passing through a modulator on which an intensity spectrum of reference signs and a sign to be recognized has been pre-recorded. A converging lens positioned downstream of the modulator, as well as devices for observing and/or analyzing the spectrum occurring at the focal plane of the lens. These devices include apparatus for detecting peaks indicating that a reference sign is identical to a sign to be recognized, as well as apparatus to separate those peaks from spurious peaks. As an example, this device can automatically recognize speed limit signs on roads or freeways.

9 Claims, 2 Drawing Sheets

METHOD AND APPARATUS FOR AUTOMATIC OPTICAL RECOGNITION OF ROAD SIGNS

BACKGROUND OF THE INVENTION

This invention relates generally to a process and apparatus for automatic object recognition. More specifically, the invention concerns a method and apparatus for automatic recognition of a road sign.

Systems aimed at reducing the amount of action required of a vehicle driver, and possibly making up for human errors on the part of the driver in the face of danger, have already been proposed.

For instance, in a general sense, automatic systems have been proposed for recognizing road signs, such as speed limit signs. According to these known systems, a correlation is established between (i) the image of the sign and (ii) a reference image corresponding to the sign's image, so that a signal can be provided when the two images are identical.

However, the systems proposed until now did not permit sufficiently fast processing and detection of the information to provide a sufficiently quick response in the driving of the vehicle, such as required for braking.

SUMMARY OF THE INVENTION

Consequently, an object of this invention is to overcome such problems by providing an automatic recognition process and device consisting of a detection system reacting very quickly to the signal corresponding to the received information, such that there is practically no delay—which could be dangerous for the vehicle—between the time the received information is captured and detected, even when the vehicle is traveling very fast.

To this end, an object of this invention is to provide a process for automatic recognition of an object, such as a road sign, which comprises the steps of:

displaying on a screen an input image containing an image of the sign to be recognized as well as images of reference signs;

passing a laser beam through that screen and an initial lens and then focusing the laser beam on a modulator or similar device capable of recording an intensity spectrum;

lighting up the modulator with a laser beam;

causing said laser beam leaving the modulator to pass through a second lens in order to produce another spectrum supplied to a detection system; and determining whether the sign to be recognized is identical to one of the reference signs based on said spectrum;

wherein the determining step involves detecting correlation peaks within the focal plane of the second lens between the various signs contained in the input image, in such a way that the presence of intensity peaks exceeding a given threshold and offset with respect to the optical center of the image indicates that the sign to be recognized is identical to one of the reference signs.

Another feature of this process is that a landscape image containing the sign to be recognized undergoes a contour detection process in order to adapt the landscape image to the input screen and decrease the spectral range.

According to yet another feature of this process, with the input image containing only two reference signs, only a portion of the landscape image containing the sign to be recognized is captured so that the sign is located within the input image on a line running between the two references.

Furthermore, if the number of references is greater than two, the sign to be recognized is compared in succession to several groups containing a maximum of two references each.

This invention also pertains to a device which implements the process having the above characteristics and comprising: a laser source providing a beam capable of passing through a modulator in which an intensity spectrum of reference signs and a sign to be recognized has already been recorded; a converging lens placed downstream of the modulator; and means of observing and/or analyzing the spectrum produced in the focal plane of the lens, wherein said means of observation includes means of detecting and separating the significant peaks of the reference sign's likeness to a sign to be recognized, from spurious peaks.

According to another feature of this device, the aforementioned means of separation includes a mask for giving different types of polarization to the portions of the beam containing the various peaks, and polarization separation optics placed downstream of the mask.

According to a preferred embodiment, the mask is a plate placed within the focal plane of the aforementioned lens, having four symmetrical areas with respect to the optical axis of the beam; two of said symmetrical areas which are symmetrical with respect to the center of the plate are half-wave plates, whereas the two other areas do not polarize.

According to yet another feature of this device, the means of detection comprises linear CCD cameras, while a spherical lens combined with a cylindrical lens is placed between the aforementioned plate and the polarization separation optics which are followed by the aforementioned CCD cameras.

BRIEF DESCRIPTION OF THE DRAWINGS

Many objects and advantages of the present invention will be apparent to those skilled in the art when this specification is read in conjunction with the attached drawings wherein like reference numerals are applied to like elements, and wherein.

DETAILED DESCRIPTION OF THE PREFERRED EMBODIMENT

Figure 1:
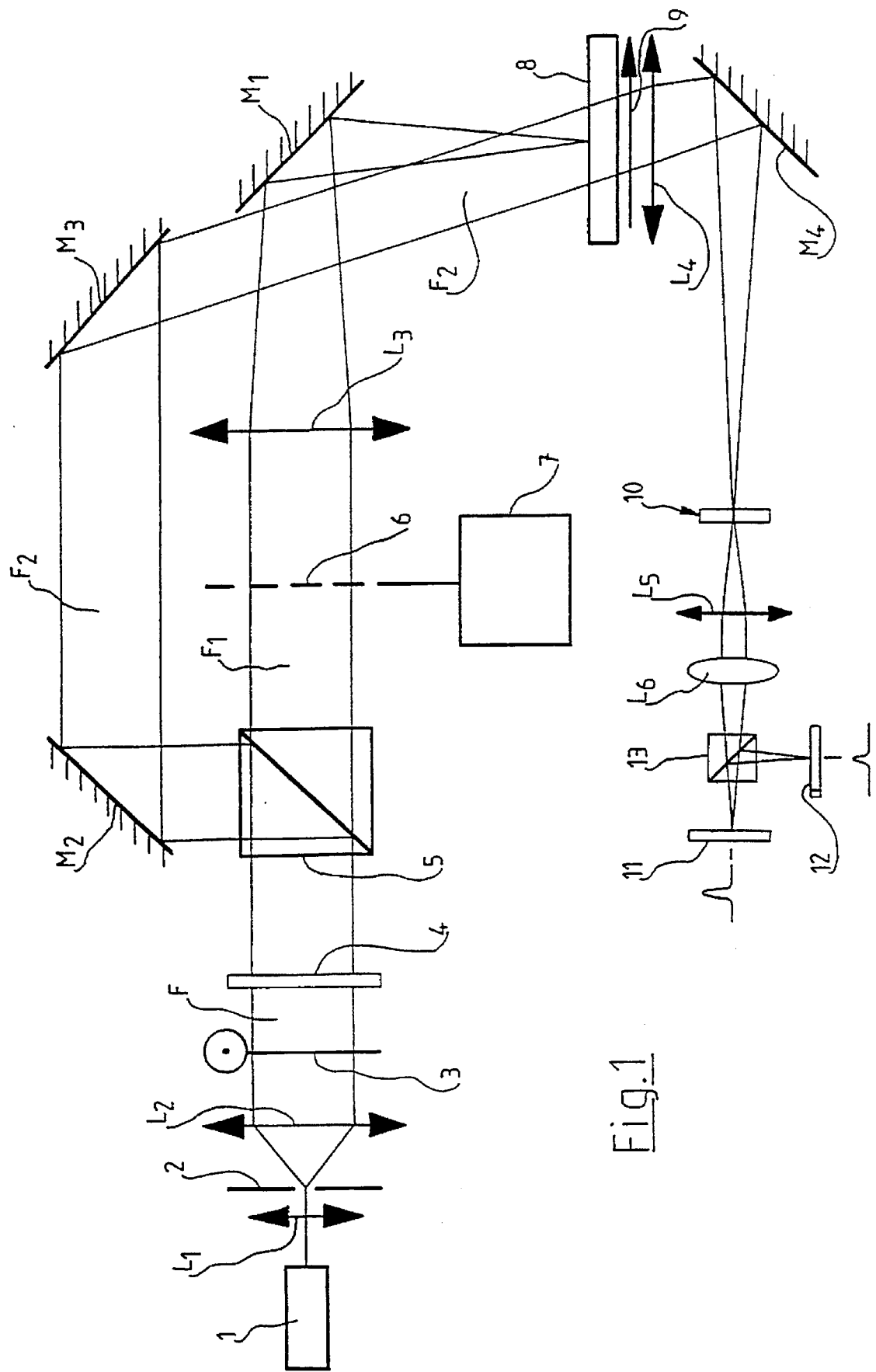
FIG. 1 is an overall schematic diagram of an automatic recognition device according to this invention.

As can be clearly seen in FIG. 1, an automatic sign recognition device according to this invention essentially consists of a laser 1 which may be a continuous helium-neon laser or semiconductor laser. In addition to the laser, the invention includes a lens $L_1$, a spatial filter 2 (which is illustrated schematically), a lens $L_2$ capable of providing parallel laser beam F, a polarizer 3, an optical shutter 4, and an initial polarization separator cube 5 capable of splitting the laser beam F into a first beam $F_1$, which will be the beam portion for recording the information, and a second beam $F_2$ to read the information, as will be explained in detail below.

The first beam $F_1$ passes through a modulator 6 which, for example, may be an electrically-addressable spatial light modulator (EASLM), that is connected in turn to a camera 7 mounted on a vehicle (not shown). After having passed through a lens $L_3$, this first beam, $F_1$, reaches a mirror $M_1$ which reflects the first beam to a modulator 8. The modulator 8 may, for example, be an optically-addressable spatial light modulator (OASLM). The intensity spectrum of the image recorded in the modulator 6 and carried by the first laser beam $F_1$ is inscribed on the modulator 8.

The optical shutter 4 is capable of changing the polarization of the laser beam F. The optical shutter allows the laser beam $F_2$ to be reflected by successive mirrors $M_2$ and $M_3$ and to follow the path illustrated. The beam laser beam $F_2$ passes through the modulator 8, then through a polarizer 9 placed at the downstream side of the modulator, then through a lens $L_4$, and to a mirror $M_4$ that reflects the laser beam $F_2$ and focuses that beam on a polarization mask 10.

Figure 2:
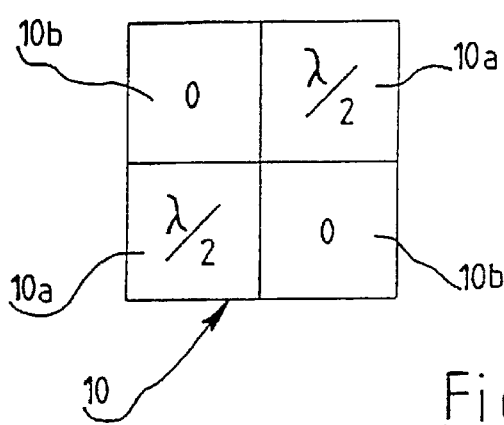
FIG. 2 is a front view of a polarization mask used in this device.

Details of the polarization mask are shown in FIG. 2. This polarization mask 10 takes the form of a plate including four areas that are symmetrically disposed with respect to the center of the plate and separated by a horizontal line and a vertical line, i.e., by perpendicular lines. Two symmetrical areas, 10a, consist of half-wave plates for the wavelength of the laser beam, whereas the two other symmetrical areas, 10b, simply consist of glass and therefore do not bring about any change in the polarization state of the laser beam passing therethrough.

On the downstream side of mask 10 is an optical arrangement including a spherical lens $L_5$ in combination with a cylindrical lens $L_6$, which together image the plane of the polarization mask 10 on each of two linear CCD cameras, 11, 12, by means of a polarization separator cube 13.

It is now important to explain how the device which we have just described operates.

Generally speaking, laser beams F and $F_1$ carry the image recorded on the modulator 6. On the modulator 8 we find an intensity spectrum translating the Fourier transform of the image captured by the laser beam $F_1$ after passing through the modulator 6. Next, the optical shutter 4, which modifies the polarization state, will allow the laser beam F to be diverted to the beam path $F_2$. The beam $F_2$ constitutes the reading beam. This reading beam $F_2$ will pass through the modulator 8 and the lens $L_4$, thus providing a correlation spectrum in the plane of the polarization mask 10 thereby translating the Fourier transform of the intensity spectrum recorded previously by the modulator 8.

Figure 3:
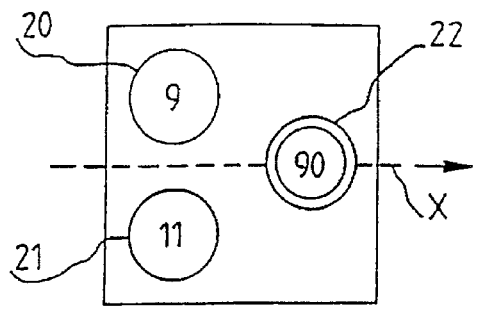
FIG. 3 is a front view of the input image containing two reference signs and a sign to be recognized.

More specifically, as can be seen in FIG. 3, the image recorded in the modulator 6, called the input image, consists, for example, of two reference signs 20, 21 and the sign to be recognized, 22. In this case, the sign 22 is a 90-km speed limit sign displayed in a landscape (not shown) by the camera 7 (see FIG. 1). We must note here that reference signs 20, 21 (FIG. 3) actually mean 90 and 110 and therefore do not contain the zero digits which are not significant. In addition, the image of the sign 22 recorded in the modulator 6 is the result of a contour detection performed by the camera 7 which only causes the sharp contours of the sign in the landscape to appear on the modulator 6. As seen from FIG. 3, the reference images or signs 20, 21 previously recorded on the modulator 6 are located in the left-hand portion, one above the other, whereas image 22 of the landscape sign to be recognized is located in the right-hand portion of the image on a horizontal line X running between references 20, 21. We must note that the camera 7, by a known technique, is capable of selecting a portion of the landscape that it displays so that the sign 22 to be recognized always appears in position 22 on the right side as shown in FIG. 3.

The distance between references 20, 21 and the sign to be recognized, 22, is converted into a phase shift when they interfere in the Fourier plane of the lens $L_3$. In this way, the modulator 8, as mentioned earlier, will record a variable intensity spectrum of the input image, with said spectrum being read by beam $F_2$ and undergoing in turn a Fourier transform by means of lens $L_4$.

Figure 4:
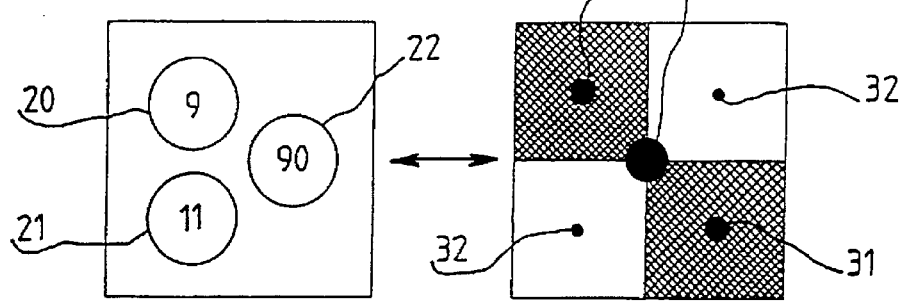
FIGS. 4 through 6, which are front views, illustrate the correlation spectrum obtained at the polarization mask for various positions of the reference signs and the sign to be recognized in the input image.
Figure 5:
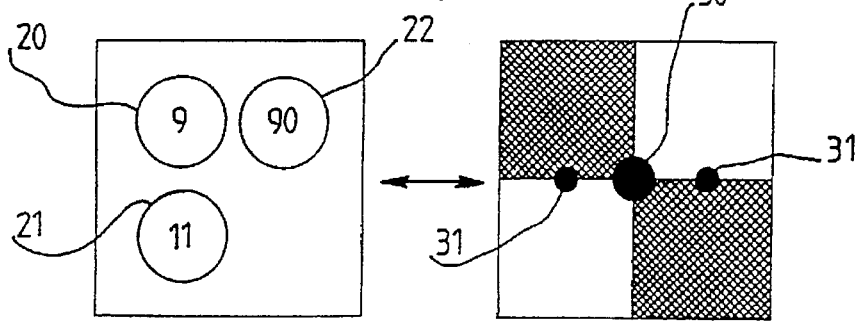
Figure 6:
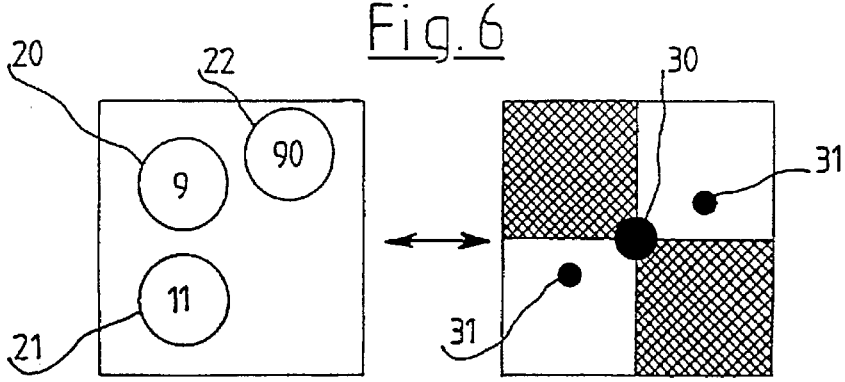

Thus, we obtain the correlation peaks at the plane of polarization mask 10 which we shall now describe in reference to FIGS. 4 through 6.

The same input image as that illustrated in FIG. 3 is shown on the left-hand portion of FIG. 4, and the various resulting correlation peaks are shown schematically on the right-hand portion of FIG. 4.

We can see that the resulting correlation spectrum consists of a very bright main peak, 30, and less intense side peaks, 31, owing to the intercorrelations between the signs. These intercorrelation peaks, 31, are distributed along a direction corresponding to the direction of a line passing through the reference sign 20 and the sign 22 to be recognized. Items 32 represent small spurious peaks.

In FIG. 5 we find the side peaks, 31, are less intense but are now distributed along a horizontal line coinciding with the horizontal line formed by the reference sign 20 and the sign 22 to be recognized.

Finally, in FIG. 6, the peaks 31 are oriented along a diagonal line that is different from that shown in FIG. 4; the position of the peaks 31 corresponds to the obliqueness of the line passing through the signs 20, 22.

At this point it is important to add that, in order to avoid any risk of confusion, it is particularly advantageous to arrive at the configuration of FIG. 4, as explained previously. Indeed, in the case of FIG. 5, if a sign to be recognized is a 110 speed limit sign, and if it is located to the fight of the reference sign 21, we will have the same configuration of secondary peaks 31, as can be seen on the right-hand portion of FIG. 5. Also, in the case of FIG. 6, we would have the same spectrum with a 110 speed limit sign located in more or less the same position as, or slightly above, the sign 22 visible in the left-hand portion of FIG. 6. Looking once again at FIG. 4, if, in place of the "90" sign 22, we had a "110" sign, the peaks 31 would align along a diagonal opposite to that shown in the right-hand portion of FIG. 4. Of course, the device is designed so that the peaks 31 have a relatively high intensity threshold compared to the spurious peaks 32 so that identification of the sign 22 to be recognized with the reference sign is unambiguous.

Before obtaining the correlation spectrum at the polarization mask 10, it must be pointed out that the polarization of beam $F_2$ is shaped with the polarizer 9. In the correlation plane, the polarization mask or plate 10, which is clearly visible in FIG. 2, will polarize the portion of the beam passing through parts 10a in one direction, and will not affect the remainder of the beam passing through parts 10b. Therefore, as an example in reference to FIG. 4, the portions of the beam corresponding to the peaks 31 will undergo a change in polarization state, whereas spurious peaks 32 will not undergo any change in polarization state. In other words, the correlation peaks 31 and the spurious peaks 32 will have orthogonal rectilinear polarization states. The system consisting of spherical lens $L_5$ and cylindrical lens $L_6$ will provide a flattened image of the correlation plane along a certain line, which is necessary for detection using linear CCD cameras 11 and 12.

However, since the flattened image may cause confusion between the correlation peaks 31 and the spurious peaks 32, a polarization separator cube, 13, is used to send each group of peaks to a different detector, that is, cameras 11 and 12. The camera 12 receives, for example, the group of peaks 32, while the camera 11 receives the group of peaks 31. In this way each camera recovers corresponding electrical signals, and an appropriate device (not shown) receiving these signals may, for example, alter the operation of the vehicle, since the speed limit sign (90 km/hour) will have been recognized.

Furthermore, it must be noted that linear CCD cameras 11, 12 can operate at a very high frequency of approximately 20 MHz so that the cameras do not limit the processing rate of the modulator 8. In addition, the cameras 11, 12 have a higher definition and are less costly than rapid cameras. Also, the device of this invention will enable time-division multiplexing on the reference signs in connection with the video rate at which the image of the sign to be recognized in the landscape is captured. In other words, the sign to be recognized can be compared in succession to a number of groups of reference signs.

Naturally, this invention is not in any way limited to the embodiment described and illustrated herein, which was only given as an illustrative example. Those of ordinary skill in the art will readily appreciate that many modifications, variations, substitutions, and equivalents exist for features of this invention which do not materially depart from the spirit and scope thereof. Accordingly, it is expressly intended that all such modifications, variations, substitutions, and equivalents that fall within the spirit and scope of the invention as defined by the appended claims are embraced thereby.

What is claimed is:

1. A process for automatic recognition of an object comprising the steps of:
    displaying on a screen an input image containing the image of the object to be recognized as well as images of reference objects;
    causing a first laser beam to pass through this screen and an initial lens in order to focus the first laser beam on a modulator capable of recording an intensity spectrum;
    illuminating the modulator with a second laser beam;
    causing said second laser beam to pass through a second lens as the second laser beam leaves the modulator in order to produce a second spectrum supplied to a detection system; and
    determining whether the image of the object to be recognized is identical to one of the images of reference objects based on the second spectrum;
    wherein the step of determining involves detecting correlation peaks of the various objects contained in the input image, within the focal plane of the second lens, in such a way that the presence of intensity peaks exceeding a predetermined threshold and offset with respect to the optical center of the image indicates that the image of the object to be recognized is identical to one of the images of reference objects; and
    wherein the portion of the beam corresponding respectively to said intensity peaks are polarized differently, and wherein said portions are separated in polarization in order to send them onto different detectors.

2. The process according to claim 1, wherein the input image originates as a landscape image containing the object to be recognized and undergoes a contour detection in order to adapt the input image to the input screen and decrease the spectral range.

3. The process according to claim 2 wherein the input image contains only two reference images, and only a portion of the landscape image containing the object image to be recognized is captured so that the object image of the input image is located on a line passing between the two reference images.

4. The process according to claim 1 wherein the number of reference images is greater than two, and the image to be recognized is compared, in succession, to each of several groups containing a maximum of two references images each.

5. The process according to claim 1, wherein the object to be recognized is a road sign and the images of reference objects are images of reference signs.

6. A device for automatic recognition of an image, comprising:
    a modulator in which a first intensity spectrum of reference images and an image to be recognized has been pre-recorded;
    a laser beam source for directing the laser beam with an optical axis so as to pass through the modulator so as to generate a second intensity spectrum having peaks and spurious peaks, the peaks indicating that one of the reference images is identical to the image to be recognized;
    a converging lens placed downstream of the modulator and receiving the laser beam after the laser beam passes through the modulator;
    means for analyzing the second intensity spectrum occurring at the focal plane of the converging lens, including means for detecting and separating the peaks of the second spectrum indicating that a reference image is identical to the image to be recognized from the spurious peaks; and
    wherein the means for analyzing includes a mask for differentially polarizing portions of the beam containing the second intensity spectrum having the various peaks, and polarization separation optics placed downstream of the mask.

7. The device according to claim 6, wherein the mask is a plate positioned within the focal plane of the lens, having four symmetrical areas with respect to the optical axis of the beam, where two symmetrical areas with respect to the center of the plate are half-wave plates, whereas the other two symmetrical areas with respect to the center of the plate do not polarize.

8. The device according to claim 7 wherein the means for detecting includes linear CCD cameras positioned downstream of a spherical lens in combination with a cylindrical lens that, in turn, is positioned between the plate and the polarization separation optics.

9. A process for automatic recognition of a road sign, comprising the steps of:
    displaying on a screen an input image containing the image of the sign to be recognized as well as images of reference signs;
    causing a first laser beam to pass through this screen and an initial lens in order to focus the first laser beam on a modulator capable of recording an intensity spectrum;
    illuminating the modulator with a second laser beam;
    causing said second laser beam to pass through a second lens as the second laser beam leaves the modulator in order to produce a second spectrum supplied to a detection system;

determining whether the image of the sign to be recognized is identical to one of the images of reference signs based on the second spectrum;

wherein the step of determining involves detecting correlation peaks of the various signs contained in the input image, within the focal plane of the second lens, in such a way that the presence of intensity peaks exceeding a predetermined threshold and offset with respect to the optical center of the image indicates that the image of the sign to be recognized is identical to one of the images of reference signs; and wherein the input image originates as a landscape image containing the sign to be recognized and undergoes a contour detection in order to adapt the input image to the input screen and decrease the spectral range.

* * * * *